No. 485, REISSUED AUG. 25, 1857.
E. CAMPBELL.
GLASS JOURNAL BOX.
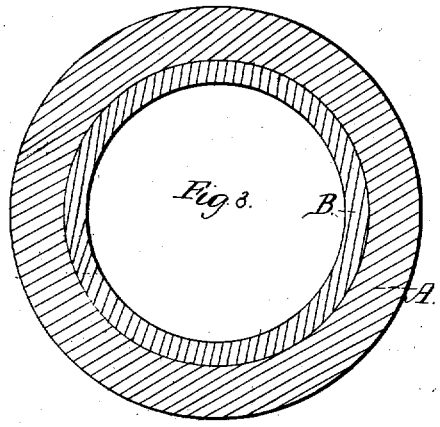
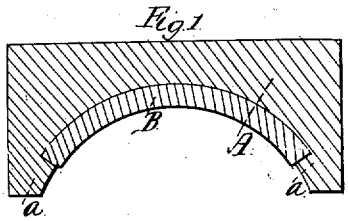
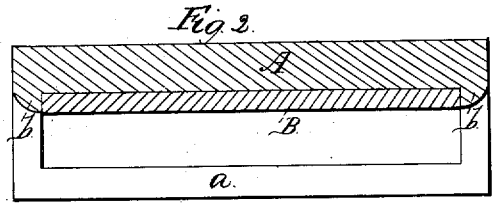
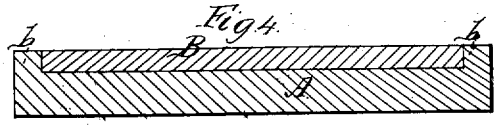
Inventor.
E. Campbell

UNITED STATES PATENT OFFICE.

EDWARD CAMPBELL, OF COLUMBUS OHIO.

IMPROVEMENT IN GLASS JOURNAL-BOXES.

Specification forming part of Letters Patent No. 13,454, dated August 21, 1855; Reissue No. 485, dated August 25, 1857.

*To all whom it may concern:*

Be it known that I, EDWARD CAMPBELL, of Columbus, in the county of Franklin and State of Ohio, have invented a new and useful improvement in journal-boxes, to be used for the bearings of journals of machinery, the axles of railroad-cars and road-carriages, as well as for other purposes where said boxes are applicable; and I do hereby declare and ascertain my said invention, referring to the accompanying drawings, in which—

Figure 1 is a cross-section of a segmental bearing. Fig. 2 is a longitudinal section of the same. Fig. 3 is a pipe-box.

It is evident that any variety of form may be made suiting the box to the purpose for which it is intended without changing the character of my invention, as hereinafter appears.

My improvement consists in the employment of a vitreous coating, such as common glass or any of the analogous vitreous compounds well known and in common use, with a metallic casting or otherwise formed box, for the purpose of forming a journal-bearing of said vitreous compounds, by which I effect great cheapness of material, durability of construction, and economy of lubrication with a more perfect bearing-surface, which is subject to less friction than is to be found in other journal-bearings with which I am acquainted.

I construct my improved journal-box in the following manner, namely: I form the back or shell of the box A of cast-iron, or other suitable metal, of the proper form on its concave side to receive the lining or coating B of vitreous material. For the more perfectly securing said lining I sometimes form in the metal box a shallow recess, wherein the lining is to be filled, which may be entirely inclosed by the projections *a a b b*, or a part or all of said projections may be omitted. The surface of the said metal box to which the vitreous lining is to be united is to be perfectly cleansed and brightened, so as to have the pure surface of the metal exposed without oxidation or other impurity upon it. This may be done in any of the well-known ways known to the trade. This metal box or shell A is then heated to a red heat, or about the temperature of glass or other vitreous substance in a plastic state, in which condition the plastic vitreous compound B is forced into it and pressed into proper form, and before these combined materials of metal with a vitreous lining have time to cool they are at once placed in an annealing-oven, and subjected to a careful and thorough annealing. On removing a box thus made from the annealing-oven it will be found that there is so perfect a union between the metal and vitreous lining that a heavy blow upon the surface of the lining will not produce a fracture.

Before these boxes, constructed as above described, are subjected to use, their bearing-surfaces should in most cases be ground true, so that they will truly and smoothly fit the surfaces of the journals for which they are intended. This completes their manufacture.

Having thus fully described my new compound journal-box, I wish to be understood as not claiming the union of glass and iron or other metal while the former is in a plastic state and the latter highly heated to form a union between them; but

What I do claim as my invention, and for which I desire Letters Patent, is—

As a new manufacture, a journal-box composed of a metal shell or body and anti-friction lining surface of vitreous material, when said vitreous material is combined with its metal back, substantially as and for the purposes set forth.

EDWD. CAMPBELL.

Witnesses:

S. O. LOVELL,

CHAS. B. SCHAEFER.